US008110315B2

(12) United States Patent
Lee et al.

(10) Patent No.: US 8,110,315 B2
(45) Date of Patent: Feb. 7, 2012

(54) MONOPOLAR MEMBRANE-ELECTRODE ASSEMBLY

(75) Inventors: Jae-yong Lee, Yongin-si (KR); Jin-ho Kim, Yongin-si (KR); Kyoung-hwan Choi, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1214 days.

(21) Appl. No.: 11/702,087

(22) Filed: Feb. 5, 2007

(65) Prior Publication Data
US 2007/0269686 A1 Nov. 22, 2007

(30) Foreign Application Priority Data

May 16, 2006 (KR) ........................ 10-2006-0043938

(51) Int. Cl.
*H01M 8/10* (2006.01)
(52) U.S. Cl. ........ 429/483; 429/517; 429/519; 429/521; 429/522
(58) Field of Classification Search ............. 429/23, 429/27, 40, 517, 463, 469, 505, 506, 123, 429/519, 522, 452, 483; 361/748, 760, 761, 361/764; *H01M 8/10, 8/02, 2/20*
See application file for complete search history.

(56) References Cited

U.S. PATENT DOCUMENTS

| 5,536,601 | A * | 7/1996 | Koksbang et al. | 429/245 |
|---|---|---|---|---|
| 6,127,058 | A * | 10/2000 | Pratt et al. | 429/480 |
| 6,410,180 | B1 * | 6/2002 | Cisar et al. | 429/481 |
| 6,689,502 | B2 | 2/2004 | Choi | |
| 7,128,994 | B2 | 10/2006 | Maeda et al. | |
| 7,166,381 | B2 | 1/2007 | Choi et al. | |
| 7,323,266 | B2 | 1/2008 | Morishima et al. | |
| 2002/0098402 | A1 | 7/2002 | Fan et al. | |
| 2003/0180594 | A1 | 9/2003 | Choi et al. | |
| 2003/0198853 | A1 | 10/2003 | Choi et al. | |

(Continued)

FOREIGN PATENT DOCUMENTS

CN 1355573 A 6/2002
(Continued)

OTHER PUBLICATIONS

Certificate of Patent No. ZL200710002310 issued in the corresponding Chinese application by the Chinese Intellectual Property Office on Aug. 12, 2009 (including a the Chinese application CN 100527514C.

(Continued)

*Primary Examiner* — Ula C Ruddock
*Assistant Examiner* — Heng Chan
(74) *Attorney, Agent, or Firm* — Lee & Morse, P.C.

(57) ABSTRACT

A monopolar membrane-electrode assembly includes an electrolyte membrane with a plurality of cell regions, an anode supporting body and a cathode supporting body on both sides of the electrolyte membrane, respectively having a plurality of apertures corresponding to the cell regions, a plurality of anode and cathode current collectors, each including a current collecting portion to correspond to each aperture of the respective anode or cathode supporting body to collect current, a conducting portion connected to a side of the current collecting portion, and a connecting line that connects the conducting portion to an outside terminal, a plurality of anode and cathode electrodes respectively formed on the and the cathode current collecting portions, and a circuit unit connected to the connecting lines of the anode current collectors and the cathode current collectors, wherein the cells are connected in series or parallel, or electrically separated through the circuit unit.

10 Claims, 8 Drawing Sheets

U.S. PATENT DOCUMENTS

| | | |
|---|---|---|
| 2004/0001992 A1 | 1/2004 | Narayanan et al. |
| 2005/0026028 A1* | 2/2005 | Ouchi et al. ............... 429/38 |
| 2006/0093909 A1* | 5/2006 | Zhang ....................... 429/209 |
| 2006/0115692 A1* | 6/2006 | Deng ......................... 429/13 |
| 2006/0269829 A1* | 11/2006 | Choi et al. ................. 429/44 |
| 2007/0065697 A1* | 3/2007 | Shu et al. .................. 429/30 |

FOREIGN PATENT DOCUMENTS

| | | |
|---|---|---|
| EP | 1 241 725 A2 | 9/2002 |
| EP | 1 357 627 A2 | 10/2003 |
| JP | 2002-280016 A | 9/2002 |
| JP | 2003-197225 A | 7/2003 |
| JP | 2004-146092 A | 5/2004 |
| JP | 2005-251731 A | 9/2005 |
| JP | 2006-086045 A | 3/2006 |
| JP | 2006-332058 A | 12/2006 |
| KR | 10 2003-0014895 A | 2/2003 |
| KR | 10 2003-0083511 A | 10/2003 |

OTHER PUBLICATIONS

Japanese Notice of Allowance in JP 2007-098357, dated Nov. 24, 2010 (Lee, et al.).

Korean Office Action in KR 10-2006-0043938, dated May 31, 2007 (Lee, et al.) (Two (2) pages; In Korean).

* cited by examiner

MONOPOLAR MEMBRANE-ELECTRODE ASSEMBLY

CROSS-REFERENCE TO RELATED APPLICATION

This application claims the benefit of Korean Application No. 2006-43938, filed on May 16, 2006 in the Korean Intellectual Property Office, the disclosure of which is incorporated herein by reference.

BACKGROUND OF THE INVENTION

1. Field of the Invention

Aspects of the present invention relate to a monopolar membrane-electrode assembly (MEA) of a fuel cell. More particularly, aspects of the present invention relate to a structure of a monopolar membrane-electrode assembly that allows ease of electrical connections between unit cells.

2. Description of the Related Art

Monopolar fuel cells have a plurality of cells that are formed on both sides of an electrolyte membrane and that are connected in series. A structure or structures to connect anode electrodes on a first surface and cathode electrodes on a second surface of the electrolyte membrane are disclosed in U.S. Publication Nos. 2003/0180594 and 2003/0198853, the disclosures of which are incorporated herein by reference.

An example of a related art current collector is disclosed in U.S. Pat. No. 6,410,180. The reference discloses a mesh type current collecting portion that is on each of the electrodes of the membrane-electrode assembly (MEA) and a conducting portion that connects the current collecting portions that are on both surfaces of the MEA. However, the related art current collector reduces the efficiency of the fuel cell due to an increase in the contact resistance between the current collecting portion and the electrode, and an increase in resistance caused when electrons freed at a catalyst layer move to the current collecting portion through a fuel diffusion layer of the electrode and a supporting body. Also, a contact resistance between the current collecting portion and the conducting portion may be high.

SUMMARY OF THE INVENTION

Aspects of the present invention include a monopolar membrane-electrode assembly with reduced resistance due to current collectors formed between an electrode and an electrolyte membrane or between a catalyst layer and a fuel diffusion layer of the electrode.

An aspect of the present invention also includes a monopolar membrane-electrode assembly that allows an easy electrical connection between a plurality of cells.

According to an aspect of the present invention, a monopolar membrane-electrode assembly includes: an electrolyte membrane in which a plurality of cell regions are formed; an anode supporting body and a cathode supporting body on both sides of the electrolyte membrane, respectively having a plurality of apertures that corresponds to the cell regions; a plurality of anode current collectors, each including a current collecting portion to correspond to each aperture of the anode supporting body to collect current, a conducting portion connected to a side of the current collecting portion, and a connecting line that connects the conducting portion to an outside terminal; a plurality of cathode current collectors, each including a current collecting portion to correspond to each aperture of the cathode supporting body to collect current, a conducting portion connected to a side of the current collector, and a connecting line that connects the conducting portion to the outside terminal; a plurality of anode electrodes and a plurality of cathode electrodes respectively formed on the anode current collecting portion and the cathode current collecting portion; and a circuit unit connected to the connecting lines of the anode current collectors and the cathode current collectors, wherein the cells are connected in series or parallel, or electrically separated through the circuit unit.

The anode supporting body and the cathode supporting body respectively may further include an extension portion that corresponds to each other, and ends of the connecting lines are disposed on the extension portions.

The current collector may be formed of a first metal or a conductive polymer having an electric conductivity of 1 S/cm or more.

The first metal is at least one of Ag, Au, Al, Ni, Cu, Pt, Ti, Mn, Zn, Fe, Sn, and an alloy of these metals.

A second metal may be plated on the first metal, and may be at least one of Ag, Au, Al, Ni, Cu, Pt, Ti, Mn, Zn, Fe, Sn, and an alloy of these metals.

The conductive polymer may be at least one of polyaniline, polypyrrole, and polythiophene.

The supporting body may be formed of a non-conductive polymer.

The supporting body may be formed of at least one of polyimide, polyethylene, polypropylene, and polyvinylchloride.

The supporting body and the corresponding current collectors may be formed integrally as a flexible printed circuit board (FPCB).

The current collectors may be formed using at least one of a sputtering method, a chemical vapor deposition (CVD) method, an electrical deposition method, a patterning method, and a metal etching method.

According to another aspect of the present invention, a monopolar membrane-electrode assembly includes: an electrolyte membrane in which a plurality of cell regions are formed; a plurality of catalyst layers formed on cell regions on both sides of the electrolyte membrane; an anode supporting body and a cathode supporting body on both sides of the electrolyte membrane, respectively having a plurality of apertures that corresponds to the catalyst layers; a plurality of anode current collectors, each anode current collector including a current collecting portion to correspond to each aperture of the anode supporting body to collect current, a conducting portion connected to a side of the current collecting portion, and a connecting line that connects the conducting portion to an outside terminal, the current collecting portion, the conducting portion and the connecting line being formed integrally; a plurality of cathode current collectors, each cathode current collector including a current collecting portion to correspond to each aperture of the cathode supporting body to collect current, a conducting portion connected to a side of the current collector, and a connecting line that connects the conducting portion to the outside terminal, the current collecting portion, the conducting portion and the connecting line being formed integrally; a plurality of fuel diffusing layers, each fuel diffusing layer on each current collecting portion of the anode current collectors and the cathode current collectors; and a circuit unit connected to the connecting lines of the anode current collectors and the cathode current collectors, wherein the cells are connected in series or parallel, or electrically separated through the circuit unit.

According to an aspect of the present invention, a monopolar membrane-electrode assembly, includes an electrolyte membrane containing a plurality of cell regions, at least one support body on a side of the electrolyte membrane and containing a plurality of apertures that correspond to the plurality of cell regions, a plurality of cells, each of which is located at one of the plurality of cell regions, and a circuit unit, wherein each of the plurality of cells is individually connected to the circuit unit and the circuit unit selectively connects and/or disconnects one or more of the plurality of cells from the remaining plurality of the cells.

According to an aspect of the present invention, a method of controlling a monopolar membrane-electrode assembly with a plurality of cells and a circuit unit, wherein each of the plurality of cells is individually connected to the circuit unit, the method includes, connecting each of the plurality of cells in series, and selectively changing the series connection of one or more of the plurality of cells relative to the remaining plurality of the cells to optimize current and/or power output.

According to an aspect of the present invention, a monopolar membrane-electrode assembly includes a support body, a circuit unit on the support body, a plurality of current collectors formed over the support body, and a plurality of connectors to separately connect each of the plurality of current collectors to the external circuit unit, wherein the plurality of the connectors are formed on peripheries of the support body.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 4 and 5 are graphs showing the performance of a direct liquid feed fuel cell according to an aspect of the present invention, wherein FIG. 4 shows voltages of six cells and FIG. 5 shows a total power density of the six cells;

FIGS. 6 and 7 are graphs showing the performance of a direct liquid feed fuel cell having the monopolar membrane-electrode assembly structure according to an aspect of the present invention, wherein FIG. 6 shows voltages of six cells and FIG. 7 shows total power density of the six cells;

DETAILED DESCRIPTION OF THE EMBODIMENTS

Figure 1:
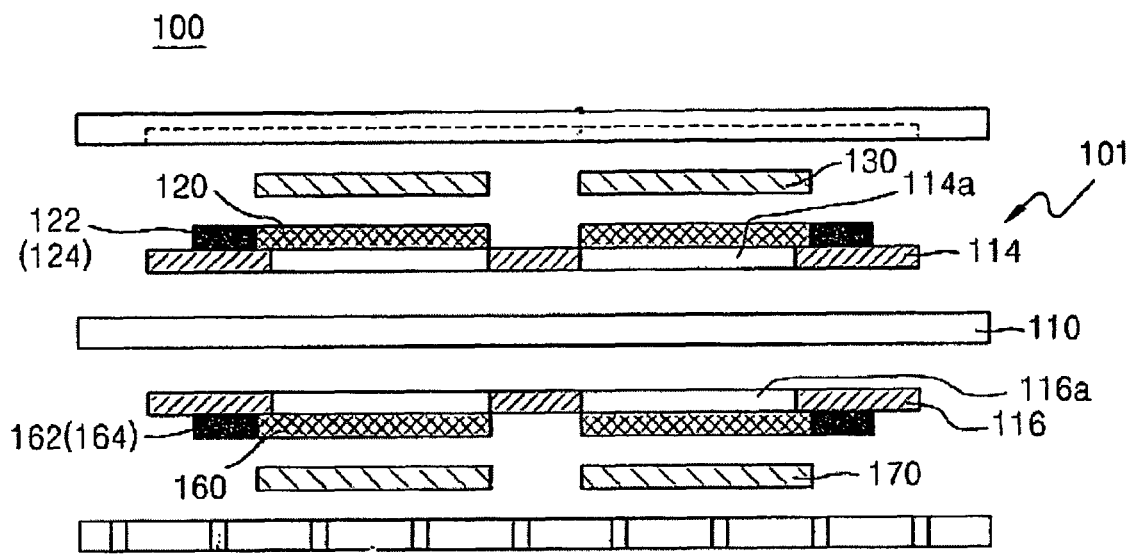
FIG. 1 is a schematic exploded cross-sectional view of a monopolar membrane-electrode assembly according to an aspect of the present invention.

Reference will now be made in detail to aspects of the present invention, examples of which are illustrated in the accompanying drawings, wherein like reference numerals refer to the like elements throughout. The aspects are described below in order to explain the present invention by referring to the figures.

Figure 2:
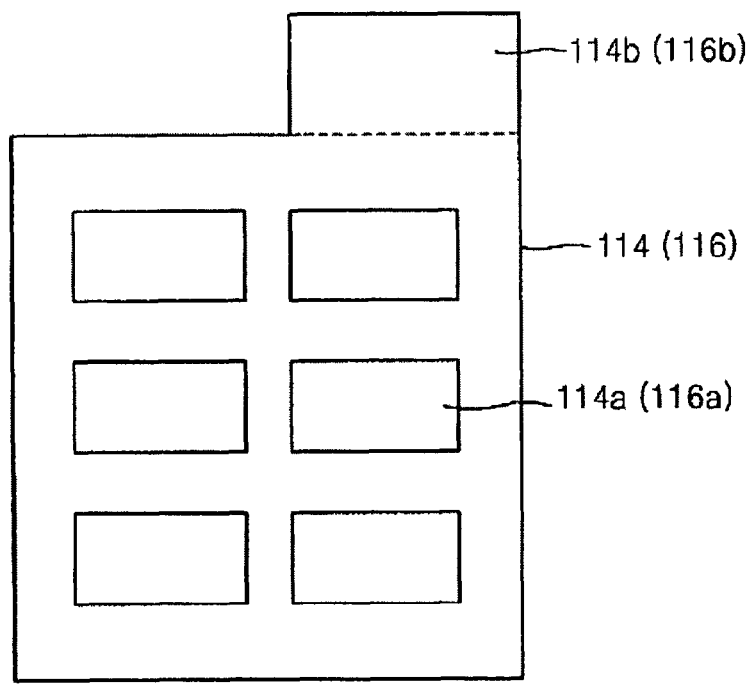
FIG. 2 is a plan view of a supporting body having apertures that correspond to each of cell regions of FIG. 1.
Figure 3:
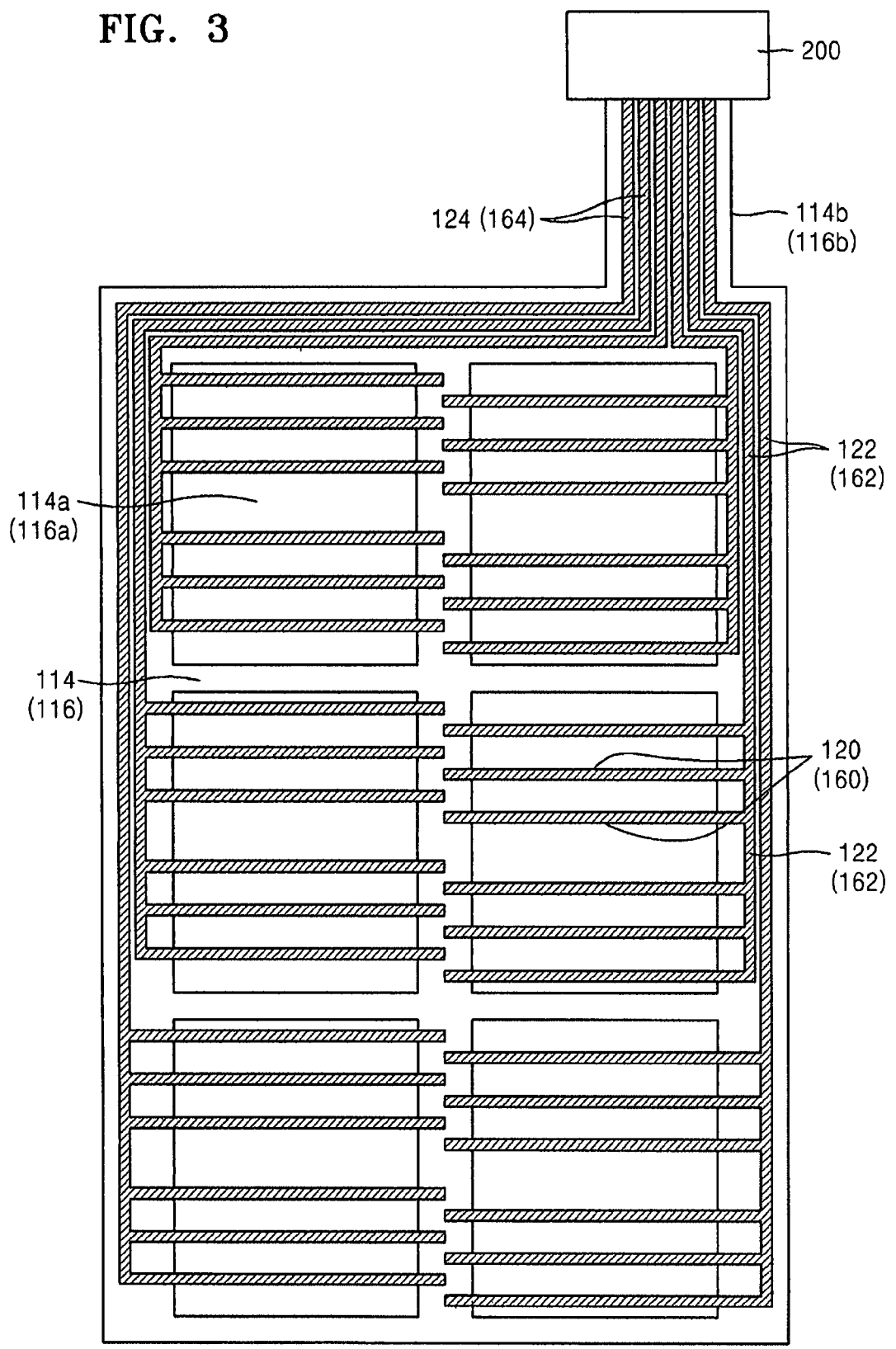
FIG. 3 is a plan view of a current collector of FIG. 1, in which a current collecting portion, a conducting portion, and connecting lines are formed in one unit.

FIG. 1 is a schematic exploded cross-sectional view of a monopolar membrane-electrode assembly 100 having an integrated current collector according to an aspect of the present invention. FIG. 2 is a plan view of a supporting body having apertures that correspond to each of cell regions. FIG. 3 is a plan view of a current collector of FIG. 1, in which a current collecting portion, a conducting portion, and connecting lines are integrally formed as one unit.

Referring to FIGS. 1 through 3, the monopolar membrane-electrode assembly (MEA) 100 includes an electrolyte membrane 110 on which a plurality of cell regions (or area) are formed. The non-limiting aspect shown has six cells (first through sixth cells). Non-conductive supporting bodies 114 and 116 are disposed on both (or separate) sides of the electrolyte membrane 110. The non-conductive supporting bodies 114 and 116 have a plurality of apertures 114a and 116a that correspond to each of the cell regions. In a non-limiting example shown, the apertures 114a and 116a are of a rectangular shape. Extension portions 114b and 116b are formed at the supporting bodies 114 and 116. The extension portions extend outward from the supporting bodies 114 and 116 pass the peripheral edge of the electrolyte membrane 110. Anode current collecting portions 120 and cathode current collecting portions 160 are formed at each cell region of the supporting bodies 114 and 116.

In a non-limiting aspect, the supporting bodies 114 and 116 can be formed of polyimide, polyethylene, polypropylene, or any combinations thereof. It should be understood that the number of the cells is not limited to six, but may be more or less. Also, it should be understood that the shape of the aperture is not limited to a rectangle, but may be other shapes, including circular, or even irregular. In a non-limiting aspect shown in FIG. 1, conducting portions 122 are formed (or extend) on a side of the anode current collecting portions 120. The conducting portions 122 extend in the supporting body 114 at the periphery thereof. Connecting lines 124 are formed on the extension portion 114b to extend from the conducting portions 122 to electrically connect the conducting portions 122 to an external circuit unit 200. Similarly, conducting portions 162 are formed (or extend) on a side of the cathode current collecting portions 160. The conducting portions 162 extend in the supporting body 116 at the periphery thereof. Connecting lines 164 are formed on the extension portion 116b to extend from the conducting portions 162 to electrically connect the conducting portions 162 to the external circuit unit 200.

In the non-limiting aspect shown, the current collecting portions 120 and 160 are prongs that extend across (completely or partially) the respective apertures 114a and 116a. It is understood that in other aspects, the current collecting portions 120 and 160 need not extend across the respective apertures 114a and 116a. Also, although shown as having six prongs, the number of prongs on the current collecting portions 120 and 160 may be more or less. Also, one or more of the prongs may have one or more branches or meshes in other aspects. In a non-limiting aspect shown, connecting lines 124 are connected to an external circuit unit 200 and connecting lines 164 are connected to the external circuit unit 200. It is understood that in other aspects, the connecting lines 124 may be connected to one external circuit unit and connecting lines 164 may be connected to another external circuit unit. The one and the other circuit unit may then be connected.

In a non-limiting aspect, anode electrodes 130 are installed on the anode current collecting portions 120, and cathode electrodes 170 are formed (installed) on the cathode current collecting portions 160. The connecting lines 124 and 164 are respectively point connected to the circuit unit 200. That is, each of the connecting lines 124 and/or 164 that correspond to each cell is extended to the circuit unit 200 separately and/or individually. In various aspects, the extension portions 114b and 116b and the circuit unit 200 may be formed anywhere on the supporting body 114 and 116, respectively, and not just on the peripheries.

In a non-limiting aspect, the current collecting portions 120 and 160, the conducting portions 122 and 162, and the connecting lines 124 and 164 may be formed of a conducting material. One such material may be a first metal. The first metal may be a transitional metal, such as Ag, Au, Al, Ni, Cu, Pt, Ti, Mn, Zn, Fe, Sn, and/or an alloy of these metals, and have an electrical conductivity greater than 1 S/cm. A second metal can be plated on the first metal to reduce or prevent corrosion of the first metal. In a non-limiting aspect, the second metal may be Ag, Au, Al, Ni, Cu, Pt, Ti, Mn, Zn, Fe, Sn, and/or an alloy of these metals.

In various aspects, a conductive polymer may be used for the current collecting portions 120 and 160, the conducting portions 122 and 162, and the connecting lines 124 and 164. The conductive polymer may have an electrical conductivity greater than 1 S/cm. In a non-limiting aspect, the conductive polymer may be formed of polyaniline, polypyrrole, polythiophene, or any combinations thereof.

Although discussed in terms of being same or similar material, the current collecting portions 120 and/or 160, the conducting portions 122 and/or 162, and the connecting lines 124 and/or 164 may be formed of a conducting material, and each may be formed of different materials with differing electrical, chemical, and/or physical properties. In various aspects, the current collecting portions 120 and/or 160 may be formed by a sputtering method, a chemical vapor deposition (CVD) method, an electrical deposition method, a patterning method, a metal etching method, or any combinations thereof.

In a non-limiting aspect, the electrodes 130 and 170 respectively may include catalyst layers (not shown) that contact the current collecting portion 120 and 160, a fuel diffusion layer on the catalyst layer, and a supporting layer on the fuel diffusion layer. In various aspects, the catalyst layers may be interposed therein.

Referring to a non-limiting aspect of FIG. 3, the integral current collectors (120 and/or 160) formed of a conductive metal may be integrated in the supporting bodies 114 and 116 formed of polyimide films to form a flexible printed circuit board (FPCB). In this case, the integral current collectors and the polyimide films 114 and 116 are integrated, and then bonded to the electrolyte membrane 110.

The MEA 100 may be fabricated as follows. First, the current collecting portions 160, the conducting portions 162, and the connecting lines 164 are integrated (or formed) into the supporting body 116. Then, one sheet of FPCB, including the supporting body 116, is disposed between the cathode electrode 170 and the electrolyte membrane 110.

Likewise, the current collecting portions 120, the conducting portions 122, and the connecting lines 124 are integrated (or formed) into the supporting body 114. Then, one sheet of FPCB, including the supporting body 114, is disposed between the anode electrode 130 and the electrolyte membrane 110. Afterward, the resultant product is hot pressed at a temperature of 125° C. with a 3 ton pressure for 3 minutes. Accordingly, the MEA 100 may be fabricated.

As shown in FIG. 3, the current collecting portions 120 and/or 160 are individually connected to the respective circuit unit 200 by conducting portions 122 and/or 162. Accordingly, the respective circuit unit 200 can individually control the connection of the current collecting portions 120 and/or 160 relative to the others. Thus, the circuit unit 200 may connect one or more of the current collecting portions 120 and/or 160 in series arrangement, parallel arrangement, or any combination, or may individually or collectively connect and disconnect one or more current collecting portions 120 and/or 160 from the whole connection selectively to optimize current and power output. In a non-limiting aspect, each of the current collecting portions 120 and/or 160 is individually addressed by the respective circuit unit 200.

Figure 4:
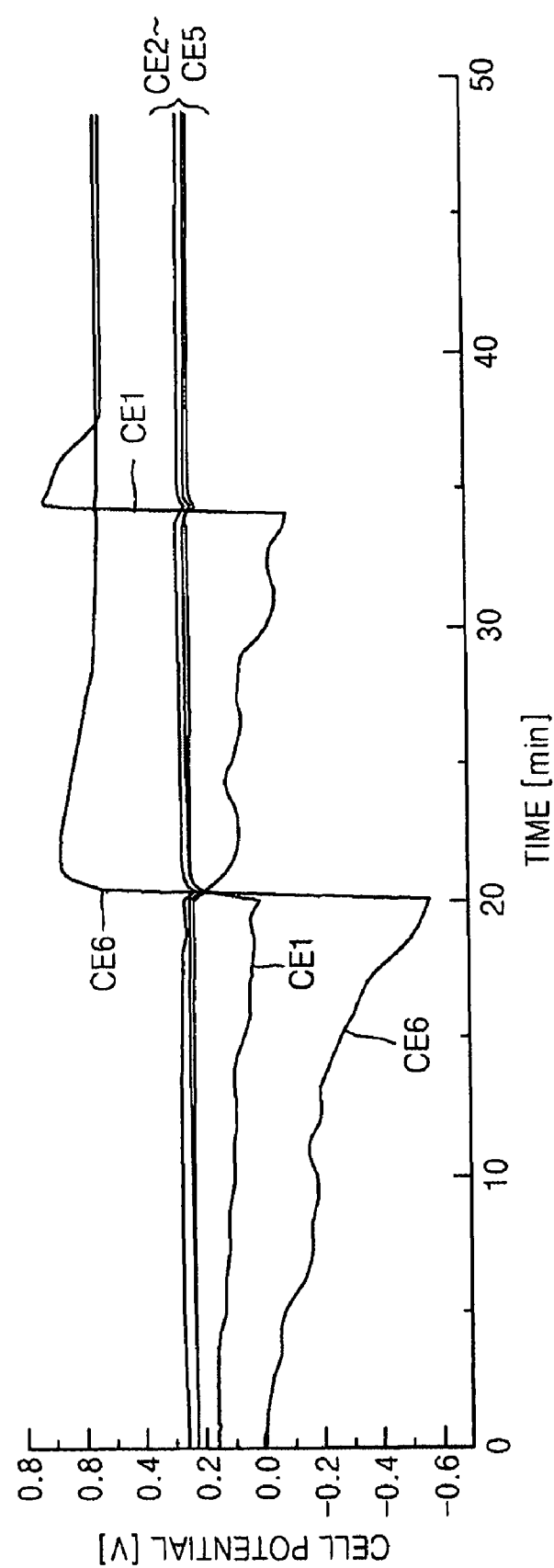
Figure 5:
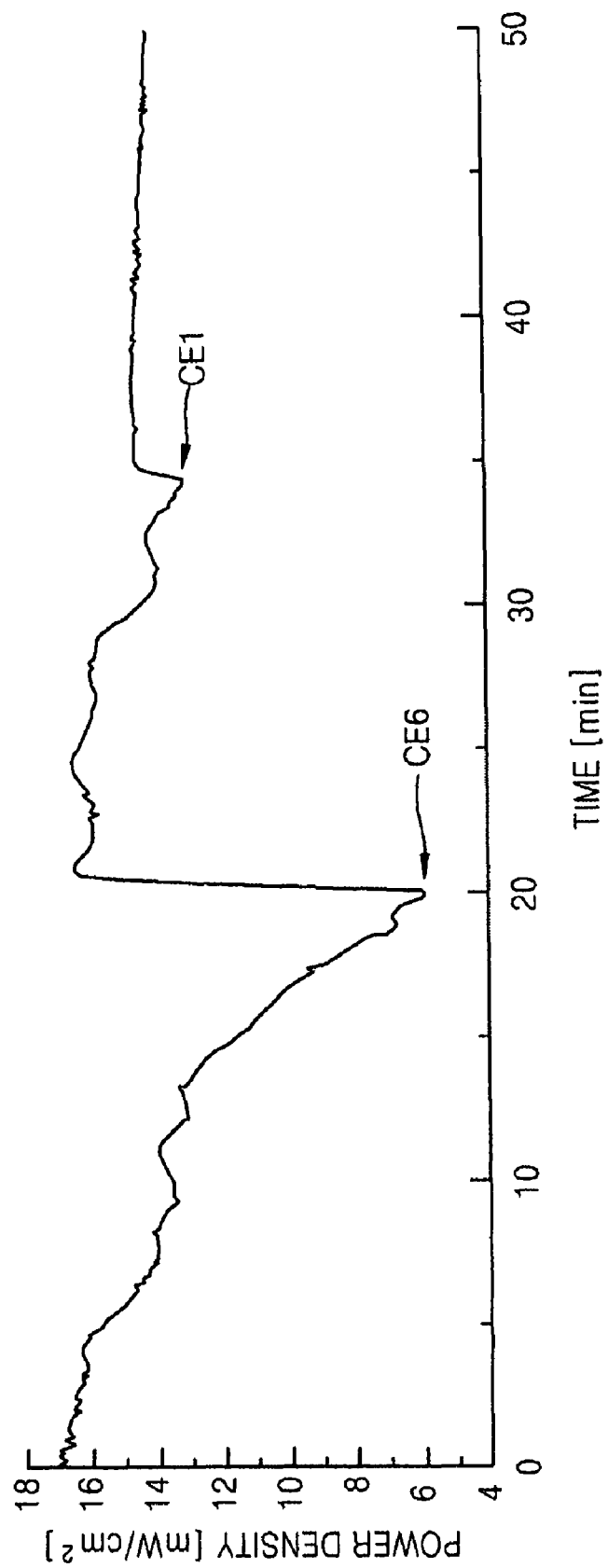

FIGS. 4 and 5 are graphs showing the performance during an example operation of a direct liquid feed fuel cell according to an aspect of the present invention, wherein FIG. 4 shows voltages of six cells and FIG. 5 shows a total power density in the case of the six cells.

During operation, the first through sixth cells CE1 through CE6 may be connected in series to produce current and power. Meanwhile, if a problem is encountered by one or more of the cells, such as if a voltage of the sixth cell CE6 is lowered and becomes negative, the fuel cell would hardly be able to function properly due to a low total output power density. Thus, by electrically separating (or disconnecting) the sixth cell CE6 from the rest of the cells, the total output power density of the entire fuel cell is restored to a normal level (or a maximum, an optimum, or a predetermined level).

Similarly, if the total output current density of the fuel cell becomes unstable as the voltage of the first cell CE1 is gradually reduced (if the first cell CE1 encounters a problem), the first cell CE1 may be electrically disconnected. Accordingly, the total output power density is recovered to a normal level (or a maximum, an optimum, or a predetermined level) by electrically separating (or disconnecting) the first cell CE1 from the rest of the cells.

In various aspects of the present invention, the monopolar membrane-electrode assembly is used to readily electrically separate (or disconnect) one or more cells that have a low voltage from one or more other cells. Accordingly, the lifetime of a fuel cell can be extended.

Figure 6:
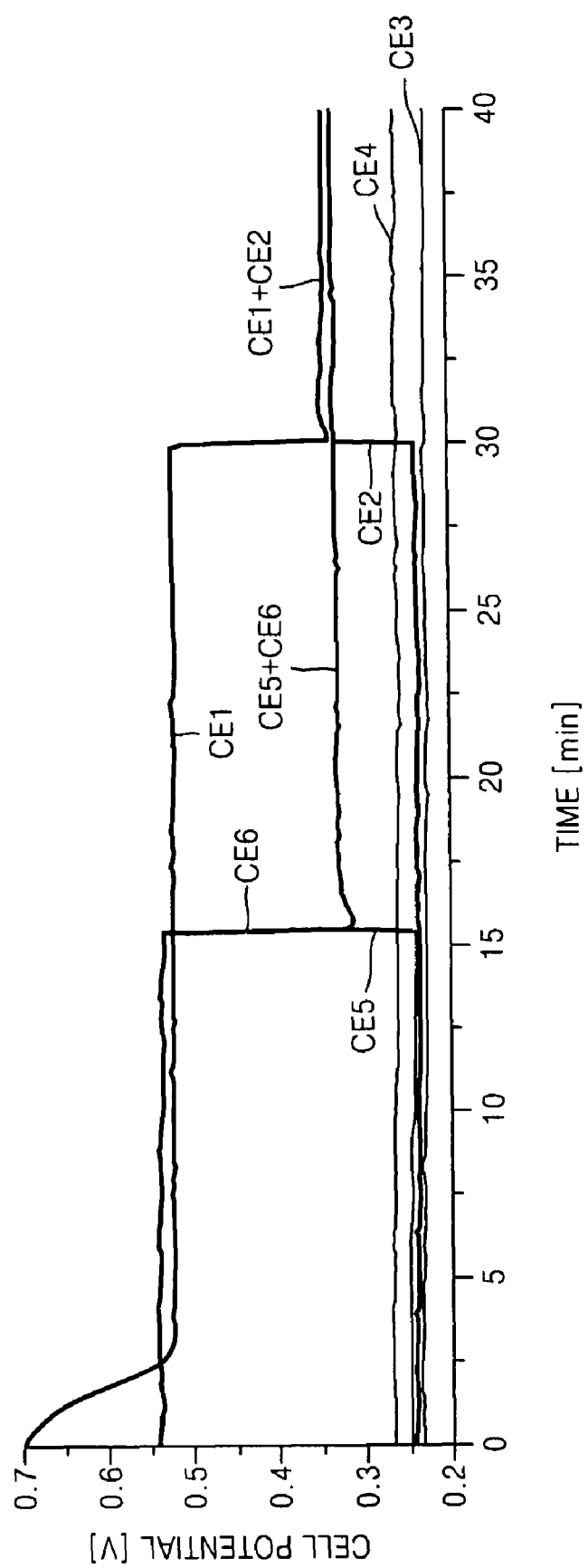
Figure 7:
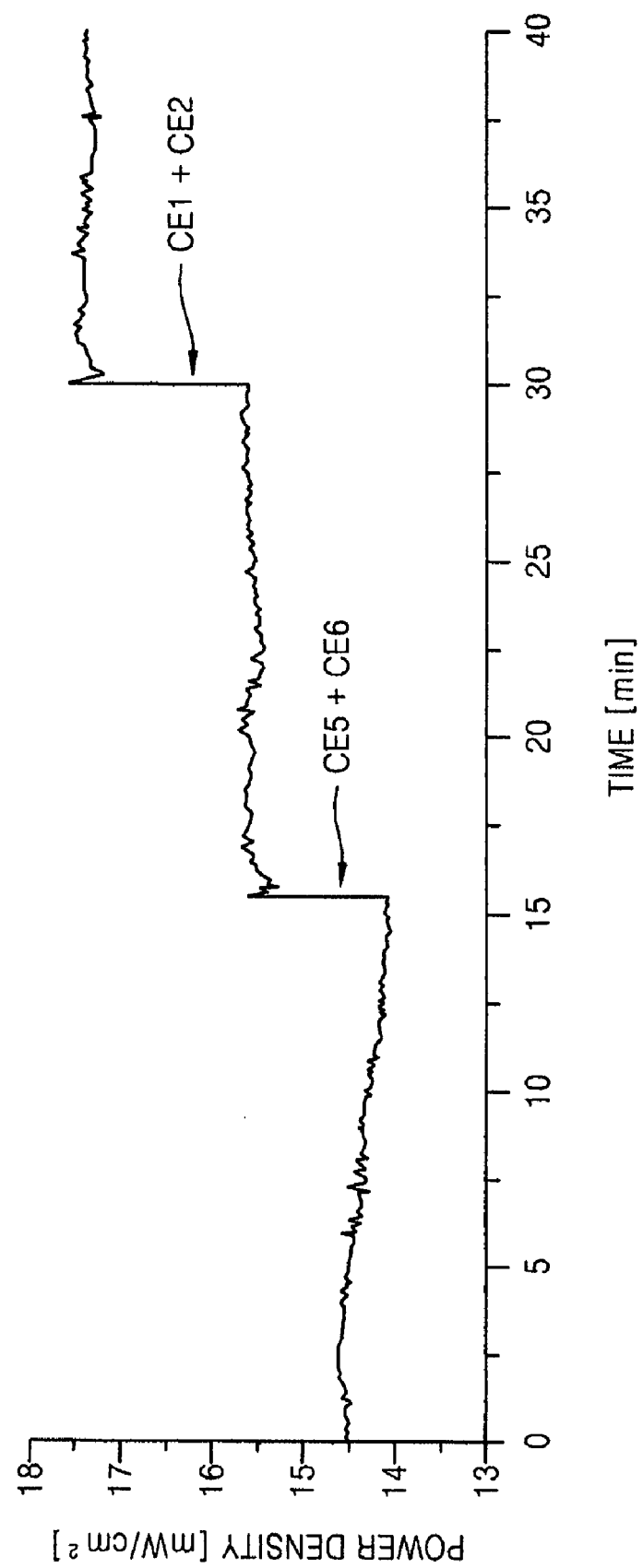

FIGS. 6 and 7 are graphs showing the performance of a direct liquid feed fuel cell having the monopolar membrane-electrode assembly structure according to an aspect of the present invention during an example operation, wherein FIG. 6 shows voltages of six cells and FIG. 7 shows total power density in the case of the six cells.

During operation, the first through sixth cells CE1 through CE6 may be connected in series to produce current and power. Meanwhile, if a problem is encountered by one or more of the cells, such as the first and/or sixth cells CE1 and CE6 show low voltages, the fuel cell would hardly be able to function as a fuel cell due to a low level of total output power density. To address the situation, the one or more cells showing low voltages may be electrically separated from the rest of the cells as shown in FIGS. 4 and 5. However, connecting the cells showing low voltages in parallel to other cells helps to increase the total output power density. Therefore, the cells having low voltages can contribute to the increase of total output power density without lowering the overall voltages by being connected in parallel to one or more other cells. For example, instead of the first cell CE1 and the sixth cell CE6 being simply electrically separated from the rest of the cells as described as above, if the sixth cell CE6 is electrically connected to the fifth cell CE5 in parallel at the circuit unit 200, the total output power density is increased. A similar increase in the total output power density is also seen with the parallel connection of the first cell CE1 with the second cell CE2.

Accordingly, it is advantageous for the increase in the total output current density to connect the non-performing cells in parallel. It is understood that the total output power density corresponds to a total output current density. Accordingly, use of the total output current density measurements is within the scope of the invention.

The membrane-electrode assembly of a fuel cell according to aspects of the present invention increases the total output current density by readily connecting a cell showing a low voltage to the rest of the cells in parallel in a circuit unit, to thereby increase the lifetime of the fuel cell.

Figure 8:
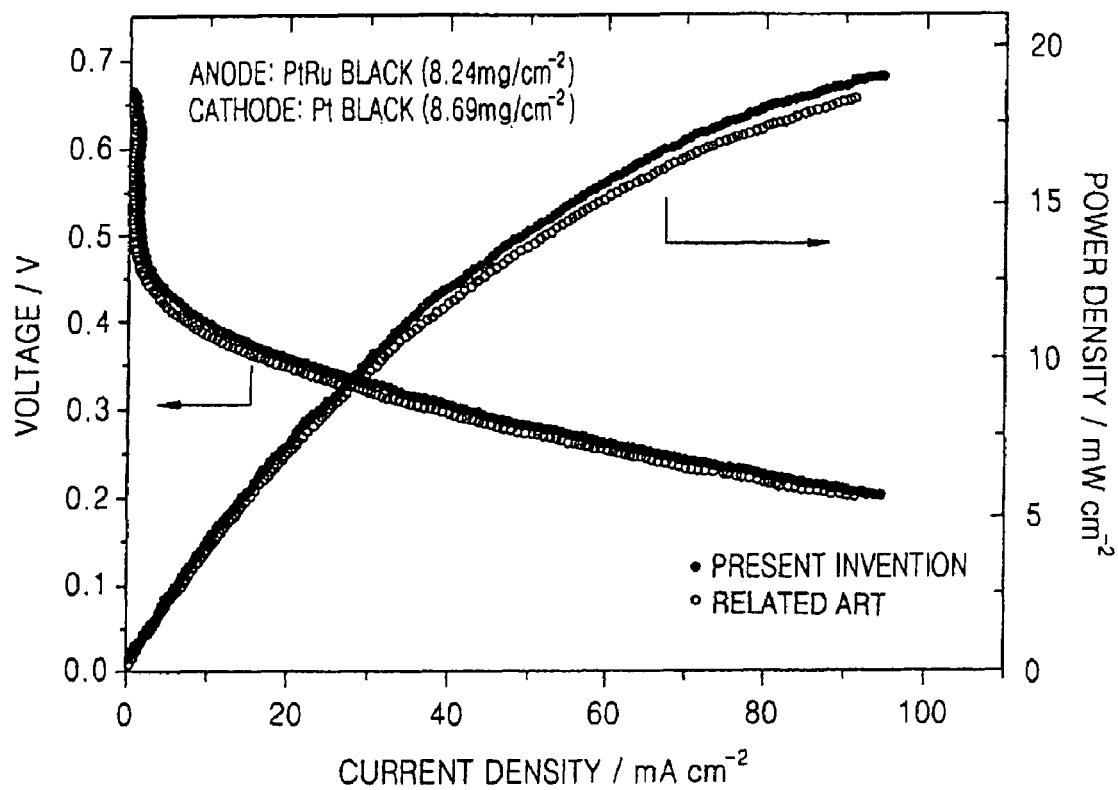
FIG. 8 is a graph showing a comparison of performance between a unit cell having a structure in which a current collector is inserted between an electrolyte membrane and a catalyst layer of an electrode according to an aspect of the present invention, and a related art unit cell that has a metal mesh current collector on an outer surface of an electrode.

FIG. 8 is a graph showing a comparison of performance between a unit cell having a structure in which a current collector is inserted between an electrolyte membrane and a catalyst layer of an electrode according to an aspect of the present invention and a related art unit cell that has a metal mesh current collector on an outer surface of an electrode. At an output voltage of 0.3V, the current density is 37 $mA/cm^2$ when the metal mesh is used. On the other hand, when a current collector is inserted between an electrolyte membrane and a catalyst layer, current density is 42 $mA/cm^2$. Accordingly, the latter case shows a current density improvement of approximately 13% higher than in the former case. That is, collection of current at a catalyst layer where electrons are freed is higher than the collection of current at an exterior part of an electrode because of low electrical resistance.

Figure 9:
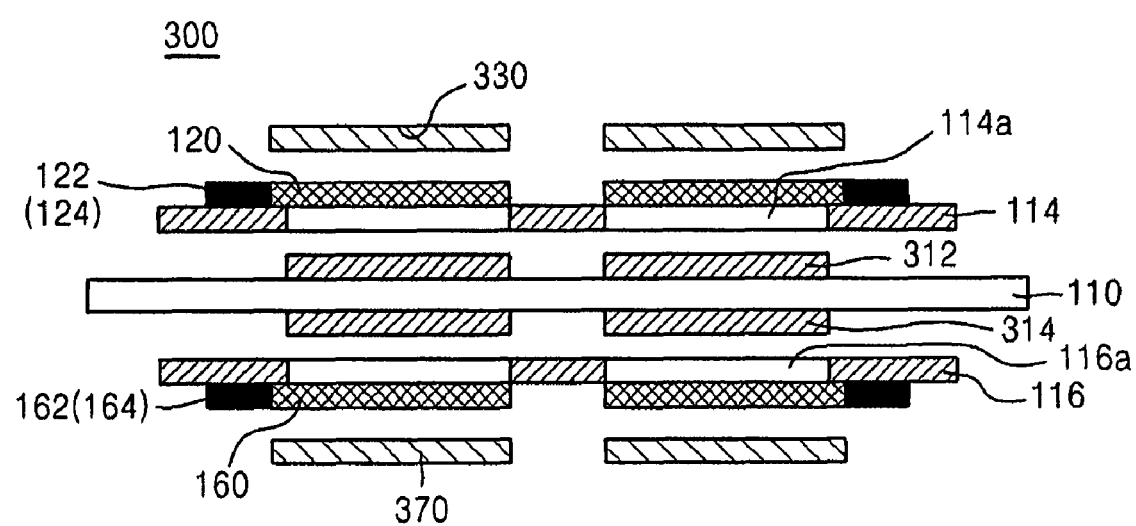
FIG. 9 is a schematic exploded cross-sectional view of a monopolar membrane-electrode assembly having an inserted current collector according to another aspect of the present invention.

FIG. 9 is a schematic exploded cross-sectional view of a monopolar membrane-electrode assembly 300 having an inserted current collector according to another aspect of the present invention. The same reference numerals are used to indicate elements substantially identical with those depicted in FIGS. 1 through 3. Accordingly, detailed descriptions thereof will be omitted.

Referring to FIG. 9, catalyst layers 312 and 314 are respectively formed in cell regions on both sides of an electrolyte membrane 110. The supporting body 114 and the anode current collector including the current collecting portion 120, the conducting portion 122, and the connecting line 124 are formed on the catalyst layer 312. The supporting body 116 and the cathode current collector including the current collecting portion 160, the conducting portion 162, and the connecting line 164 are formed on the catalyst layer 314. The fuel diffusion layer and the electrode supporting layer 330 and 370 are respectively formed on the current collectors 120 and 160.

The catalyst layers 312 and 314 are formed on the both (or separate) sides of the electrolyte membrane 110 using a decal method, a screen printing method, a direct coating method, or any combinations thereof. Next, the current collectors and the fuel diffusion layer, and the electrode supporting layer 330 and 370, are respectively disposed on the catalyst layers 312 and 314. The resultant product is then hot pressed to complete the fabrication of the MEA 300.

The operation of the membrane-electrode assembly 300 of FIG. 9 is substantially the same as the operation of the membrane-electrode assembly depicted in FIGS. 1 through 3. Accordingly, a detailed description thereof will be omitted.

The monopolar membrane-electrode assembly according to aspects of the present invention has a connection structure that can readily change the connection of cells in series, parallel, or can readily electrically separate the connection of cells during operation using a circuit unit, to thereby increase the lifetime of the fuel cell.

Also, the fuel cell according to aspects of the present invention has low resistance since current collectors are installed to directly contact the catalyst layers where electrons are freed, to thereby increase the fuel cell efficiency.

In various aspects, a plurality of connectors separately connects each of the plurality of current collectors to the external circuit unit, and a plurality of the connectors is formed on peripheries of the support body. The connectors of collectors that are further from the circuit unit are formed closer to peripheral edges of the support body than collectors of the circuit units that are closer to the circuit unit.

In various aspects of the present invention, the fuel and/or the oxygen may be gas. In various aspects, the connection and disconnection of the fuel cells may be controlled by a computer. Also, while not required in all aspects, elements of a method to connect and disconnect the fuel cells can be implemented as software and/or firmware for use with one or more processors and/or computers. Moreover a processor and/or computer readable medium maybe encoded with computer and/or processor-executable instructions for performing the method.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A monopolar membrane-electrode assembly, comprising:
   an electrolyte membrane in which a plurality of cell regions are formed;
   an anode supporting body and a cathode supporting body on respective sides of the electrolyte membrane, each of the anode supporting body and the cathode supporting body having a plurality of apertures that corresponds to the cell regions, the anode supporting body and the cathode supporting body respectively further including an anode extension portion and a cathode extension portion that correspond to each other;
   a plurality of anode current collectors, each comprising a current collecting portion to correspond to each aperture of the anode supporting body to collect current, a conducting portion connected to a side of the current collecting portion, and a connecting line connected to the conducting portion, wherein each anode current collector is integrally formed such that the current collecting portion includes conductive prongs that extend across the corresponding aperture of the anode supporting body, the conducting portion combines the conductive prongs of the current collecting body into a single conductive line that extends along a periphery of the anode supporting body to the anode extension portion and the connecting line is an extension of the conducting portion across the anode extension portion of the anode supporting body;
   a plurality of cathode current collectors, each comprising a current collecting portion to correspond to each aperture of the cathode supporting body to collect current, a conducting portion connected to a side of the current collector collecting portion, and a connecting line connected to the conducting portion, wherein each cathode current collector is integrally formed such that the current collecting portion includes conductive prongs that extend across the corresponding aperture of the cathode supporting body, the conducting portion combines the conductive prongs of the current collecting body into a single conductive line that extends along a periphery of the cathode supporting body to the cathode extension portion, and the connecting line is an extension of the conducting portion across the cathode extension portion of the cathode supporting body;

a plurality of anode electrodes and a plurality of cathode electrodes respectively formed on the anode current collecting portion and the cathode current collecting portion such that unit cells are formed in the cell regions, and wherein each anode current collecting portion is between an anode electrode and the electrolyte membrane and each cathode current collecting portion is between a cathode electrode and the electrolyte membrane; and a circuit unit connected to the connecting lines of the anode current collectors and the cathode current collectors, wherein the circuit unit selectively connects the unit cells in series or in parallel, and selectively connects or disconnects one or more of the unit cells from remaining unit cells.

2. The monopolar membrane-electrode assembly of claim 1, wherein ends of the connecting lines of the anode current collectors and the cathode current collectors are respectively disposed on the anode extension portion and the cathode extension portion.

3. The monopolar membrane-electrode assembly of claim 1, wherein each current collector of the plurality of anode current collectors and the plurality of cathode current collectors is formed of a first metal or a conductive polymer having an electric conductivity of 1 S/cm or more.

4. The monopolar membrane-electrode assembly of claim 3, wherein the first metal is at least one of Ag, Au, Al, Ni, Cu, Pt, Ti, Mn, Zn, Fe, Sn, and an alloy of these metals.

5. The monopolar membrane-electrode assembly of claim 4, wherein a second metal is plated on the first metal.

6. The monopolar membrane-electrode assembly of claim 5, wherein the second metal is at least one of Ag, Au, Al, Ni, Cu, Pt, Ti, Mn, Zn, Fe, Sn, and an alloy of these metals.

7. The monopolar membrane-electrode assembly of claim 3, wherein the conductive polymer is at least one of polyaniline, polypyrrole, and polythiophene.

8. The monopolar membrane-electrode assembly of claim 1, wherein each of the anode supporting body and cathode supporting body is formed of a non-conductive polymer.

9. The monopolar membrane-electrode assembly of claim 8, wherein each of the anode supporting body and cathode supporting body is formed of at least one of polyimide, polyethylene, polypropylene, and polyvinylchloride.

10. The monopolar membrane-electrode assembly of claim 1, wherein the anode current collectors and the cathode current collectors are formed using at least one of a sputtering method, a chemical vapor deposition (CVD) method, an electrical deposition method, a patterning method, and a metal etching method.

* * * * *